Sept. 21, 1965
A. NEVULIS ETAL
3,207,178
COMBINATION MOTOR CONTROL VALVE
AND EXHAUST FLOW CONTROL
Filed Jan. 4, 1963
3 Sheets-Sheet 1
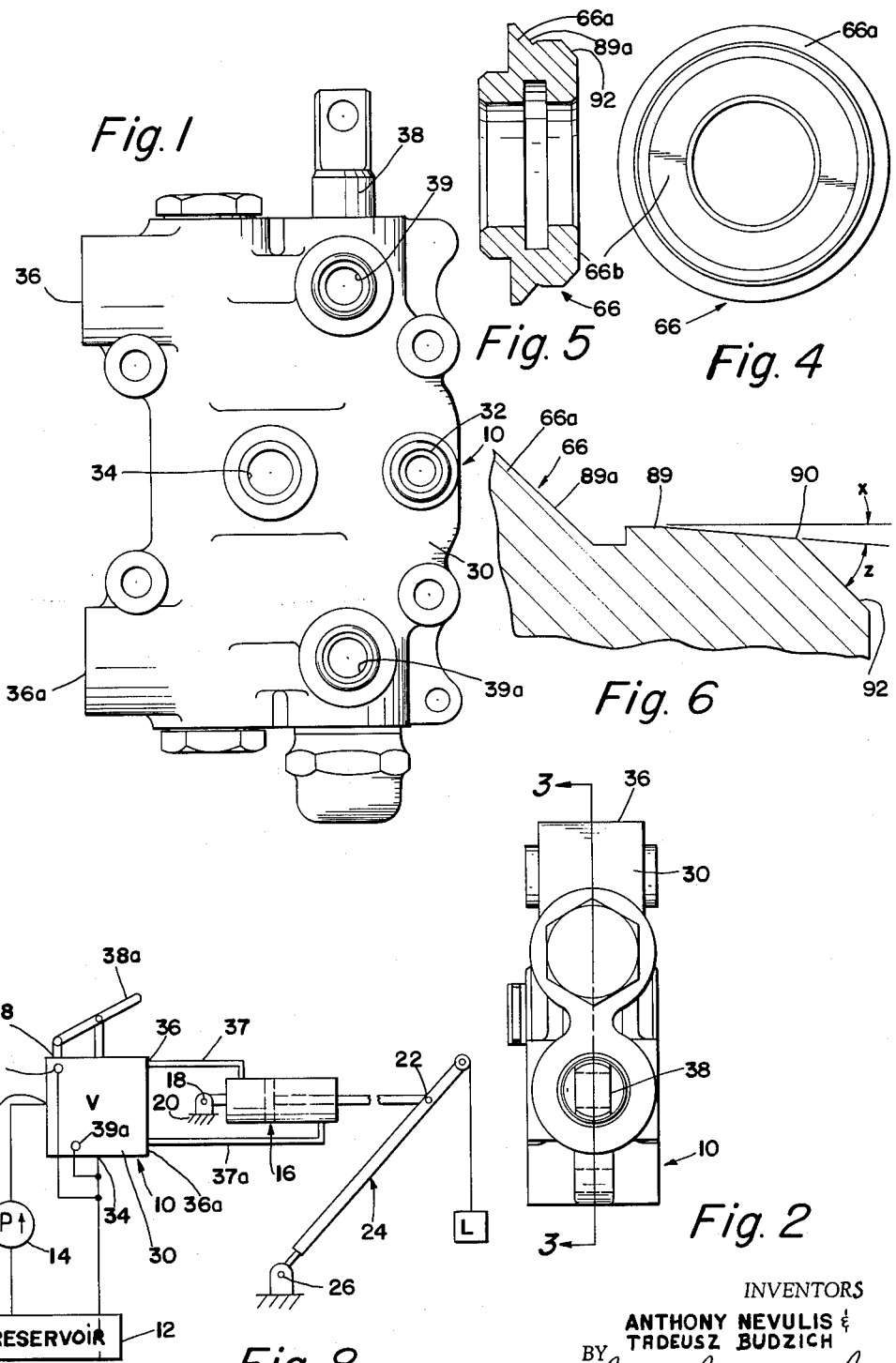
INVENTORS
ANTHONY NEVULIS &
TADEUSZ BUDZICH
BY
Teare, Fetzer & Teare
ATTORNEYS INVENTORS
ANTHONY NEVULIS &
TADEUSZ BUDZICH
BY
Teare, Tetzer & Teare
ATTORNEYS INVENTORS
ANTHONY NEVULIS &
TADEUSZ BUDZICH
BY Teare, Tetzer & Teare
ATTORNEYS United States Patent Office 3,207,178
Patented Sept. 21, 1965

3,207,178
COMBINATION MOTOR CONTROL VALVE AND EXHAUST FLOW CONTROL
Anthony Nevulis, Wickliffe, and Tadeusz Budzich, Cleveland, Ohio, assignors, by mesne assignments, to The Ohio Brass Company, Mansfield, Ohio, a corporation of New Jersey
Filed Jan. 4, 1963, Ser. No. 249,358
8 Claims. (Cl. 137—596.2)

This invention relates in general to valve mechanism, and more particularly to a valve mechanism adapted for use in controlling movement of a fluid powered motor unit.

In fluid pressure control systems, it is conventional to control the application of pressurized fluid and the direction of flow of pressurized fluid, to a fluid powered motor unit, by means of a spool or slide-type control valve. A typical example is the use of a spool valve to control the movement of a reciprocal hydraulic ram or motor unit, which ram is used, for instance, in moving or controlling a pivotal boom or the like. Installations such as these are often found, for example, on utility-type trucks, wherein the trucks mount a boom for handling utility poles, equipment, and the like, and wherein the boom is pivotal in a generally vertical plane, often times through an angular range of 180° or more, and which may also be rotatable about a generally vertical axis.

It is generally desirable in such an arrangement to be able to hydraulically lock the piston or the ram of the motor unit in selected position in its cylinder by proper positioning of the spool of the control valve. Accordingly, the control valve may be of a fairly precisely manufactured product, utilizing fairly close tolerances between the valve spool and the valve spool bore in the valve body, in order to prevent as much as possible, drifting of the motor unit piston, especially under load. Moreover, check valves are sometimes incorporated in such a control valve, to aid in preventing reverse flow of fluid from the motor unit in a predetermined control valve position.

However, since it is impossible to predict when moving a load what the pressure will be inside the motor unit, since it is generated in part by the load itself, which not only varies from application to application, but may also vary in a particular application at every instant during movement of that motor unit, these prior art arrangements have not been entirely satisfactory, being generally difficult to control and usually possessing cavitation and chattering problems.

In the copending United States patent application, Serial No. 225,315, filed September 21, 1962, by Anthony Nevulis, there is disclosed a novel control valve embodying a power checking device, and a control valve adapted for use in effectively controlling the movement of a fluid powered motor unit. The present invention provides an improved arrangement of such type of control valve, and one that even more precisely and smoothly controls the operation of an associated fluid powered motor unit.

Accordingly, an object of the present invention is to provide a novel control valve for use in optimumly controlling the movement of an associated fluid powered motor unit.

Another object of the invention is to provide a novel control valve which will be operative to lock, without drift, fluid acting on a motor unit, after the desired movement of the motor unit has been obtained.

Another object of the invention is to provide a novel control valve for optimumly controlling a fluid powered motor unit, and which valve has means therein providing for controlled movement of the load, independent of the size of the load.

A still further object of the invention is to provide a control valve of the latter mentioned type which provides for positive anti-cavitation control.

A still further object of the invention is to provide a novel control valve including a fluid balanced, exhaust, check valve therein, in conjunction with a fluid pressure responsive plunger member, for controlling the flow of pressurized fluid from a motor unit, and wherein during movement of the load by the associated motor unit, the movement of the exhaust check valve is generally independent of changes in the pressure force due to the loading, wherein the rate of movement of the load may be determined by the pump output of the system.

Another object of the invention is to provide a novel poppet type check valve for use for instance in a control valve of the latter mentioned type, and wherein the valve member of the check valve has a tapered face coacting with the valve seat, for smoothly metering the flow of pressurized fluid through the check valve upon actuation of the latter.

Other objects and advantages of the invention will be apparent from the following description taken in conjunction with the accompanying drawings wherein:

FIG. 1 is a side elevational view of a spool-type control valve embodying the invention;

FIG. 2 is a top plan view of the valve of FIG. 1;

FIG. 4 is an enlarged, end elevational view of the valve member utilized in the poppet check valve sub-assembly of the control valve of FIGS. 1 and 2;

FIG. 5 is a sectional view of the FIG. 4 valve member;

FIG. 6 is an enlarged, fragmentary, section of the valve member of FIGS. 4 and 5, showing in detail the configuration which provides for metering through the valve;

FIG. 8 is a diagrammatic illustration of a system embodying the control valve of the invention, and in conjunction with a reciprocal motor unit and load attached thereto.

Figure 3:
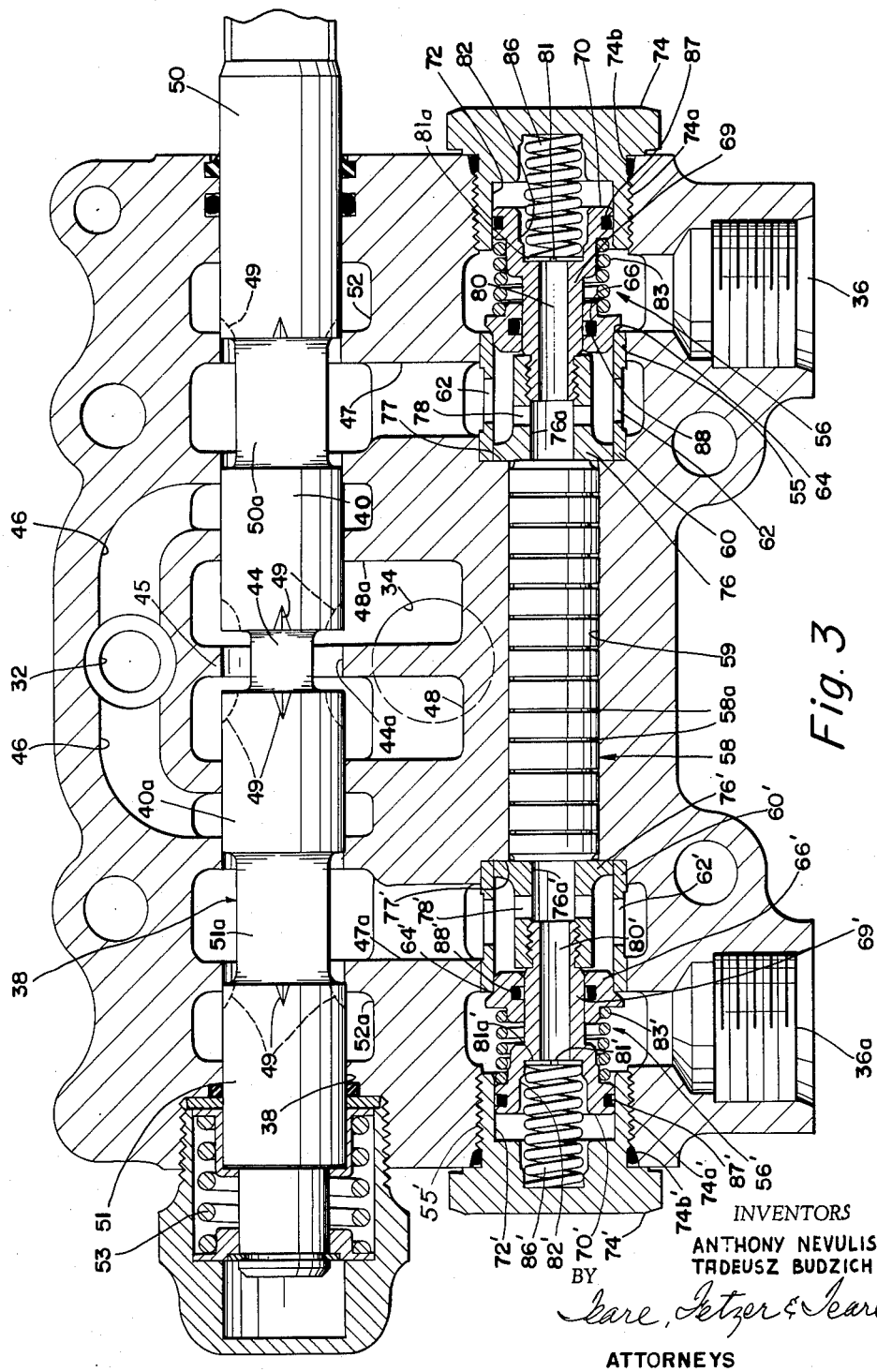
FIG. 3 is an enlarged, vertical sectional view taken generally along the plane of line 3—3 of FIG. 2, looking in the direction of the arrows.

Referring now again to the drawings, the reference numeral 10 designates a control valve embodying the invention, and as shown in FIG. 8, such valve may be connected into a hydraulic system comprising a reservoir 12, a pump 14, which may be of the constant volume output type, a reciprocal, fluid powered motor unit 16 pivotally coupled as at 18 to a support 20 and pivotally connected as at 22 to a load supporting member 24. The load supporting member may be pivoted as at 26 to a support, and for instance as is conventional in the utility truck field, and may be represented in actual practice by, for instance, a boom member pivotally supported on a utility truck for handling telephone poles and other equipment.

The valve 10 with which this invention is particularly concerned comprises a housing or body 30 which may have an inlet port 32 for inflow of pressurized fluid from the pump 14, and an exit port 34 for the exit of such fluid from the valve. The valve 10, which as illustrated in the drawings, is of the four-way, open center type, also embodies distributing ports 36, 36a (FIG. 3) which may be used as inlet and exhaust ports respectively, or vice versa, depending upon the direction of fluid flow through such ports as determined by the position of the control valve spool 38. Ports 36, 36a are adapted for coupling to the motor unit 16, and as by means of flexible flow or fluid transmission lines 37, 37a. Exhaust ports 39, 39a (FIGS. 1 and 8) connected to the reservoir 12 are also provided and will be hereinafter discussed in greater detail.

The spool 38 may comprise the generally centrally located but spaced land or cylindrical portions 40, 40a (FIG. 3) defining an intermediate groove portion 44. Spool 38 extends through opening 44a in central web 45 of the valve body, and lands 40, 40a are adapted to close such opening upon predetermined axial movement of spool 38. With the spool in its neutral position as shown in FIG. 3, the pressurized fluid in passageway 46 in the valve body is prevented from flowing into passages or chambers 47, 47a in the valve body, but instead such pressurized fluid flows from inlet 32 into chamber 48, through opening 44a into chamber 48a and thence through outlet 34 back to the reservoir. Land portions 40, 40a have spaced metering slots or grooves 49 therein at the inner end portions thereof which meter the flow through opening 44a in web 45, for reasons to be hereinafter described in greater detail. Spool 38 also comprises upper land 50 separated from land 40 by groove portion 50a, and lower land 51 separated from land 40a by groove portion 51a. Land 50 controls the movement of pressurized fluid from passageway 47 to chamber 52 in the valve body, which chamber 52 communicates with exhaust port 39, and thence back to the reservoir, while land 51 controls the movement of pressurized fluid from passageway 47a into chamber 52a, which chamber 52a communicates with exhaust port 39a, and thence back to the reservoir. Lands 50 and 51 are also preferably provided on their inner ends with circumferentially spaced metering slots 49, and it will be noted that in the neutral position of spool 38, such slots communicate respectively chamber 52 with passageway 47 and chamber 52a with passageway 47a. Spring 53 resiliently urges spool 38 into neutral position in the conventional manner.

Positioned in each of transversely extending chambers or bores 55, 55' in the valve housing 30 and communicating with the respective one of the motor unit fluid transmitting passageways 47, 47a, is a respective power check valve device 56, 56', with such power check devices coacting with one another by means of a reciprocal force transfer plunger 58 slidably mounted for axial movement in bore 59, extending between and communicating with the aforementioned valve bores 55, 55'. Plunger 58 may have circumferentially extending grooves 58a formed therein, for aiding in resisting leakage of fluid between bores 55, 55'.

Since the power checking devices 56, 56' are identical in construction, only one will be described in detail, with the parts of the other being designated by like numbers, but having the suffix prime (') added thereto. Power checking 56 may comprise a valve seat 60 disposed or pressed into a complementary part of the aforementioned bore 55, with such valve seat being provided with openings 62 therein. Valve seat 60 at its outer end provides a valve seating surface or edge 64 which is adapted for engagement with the poppet valve member 66 (FIGS. 3, 4 and 5) of the respective checking device. Valve member 66 comprises a generally frusto-conical head portion 66a adapted for engagement with the aforementioned edge 64 of the valve seat 60, and an axially extending body portion 66b adapted to be received in telescoped relation in the seat 60.

Member 66 is apertured axially thereof and is slidably mounted for axial movement on stem section 69 of balancing piston member 70, which balancing piston member 70 is slidably mounted for axial movement in cylindrical portion 72 provided by or defined by the inner end of cap member 74. Cap member 74 may be threadedly engaged as at 74a with the valve body, and may be provided with sealing means 74b for sealing coaction therewith.

The end of the stem portion 69 of balancing piston 70 which is remote from the piston may be provided with an abutment nut member 76 having an axial passageway 76a extending completely therethrough. The nut member 76 may be secured as by means of threads with the balancing piston stem 69, and at its forward end includes a widened portion for abutting relation with the confronting surface 77 of bore 55 in the housing 30. The nut is provided with transverse openings 78 therein which communicate the passageway 76a with the passageway 47 in the housing and via apertures 62 in the seat 60. Passageway 76a also communicates, via axial passageway 80 in the stem 69 of the balancing piston, with the cylindrical section 72 in the cap 74, and via an orifice 81 in a washer-like member 81a disposed in recess 82 in the piston member 70.

Spring 83 extends under predetermined compression between the valve member 66 and the balancing piston 70 and is adapted for further compression upon movement of the valve member 66 toward piston 70.

A spring member 86 coacts between the cap 74 and the recessed seat 82 of the balancing piston member, and urges the balancing piston member forwardly to cause abutting coaction between the nut 76 and the confronting surface 77 of the bore 55 and into engagement with force transfer plunger 58. A sealing member 87 may be provided between the piston 70 and the confronting surface of the bore 72, and sealing member or O-ring 88 may be provided in valve member 66 between the generally cylindrical stem 69 and the valve member 66.

The area of the balancing piston 70 exposed to the fluid pressure in for instance motor port 36 is approximately the same as the area enclosed by the seating surface 64, therefore providing for a power check valve assembly that is generally pressure balanced so far as the fluid pressure occasioned by the load (e.g., L) is concerned. Accordingly, once the pressure in for instance passage 47 becomes the same as that at port 36, the check valve member 66 will be maintained in contact with the seating surface 64 due to the spring 83, and thus the sealing at the engagement between valve member 66 and seat 60 is performed primarily by the force of such spring 83. A rise in fluid pressure in the passage 47 once it overcomes the preload in spring 83, will cause check valve member 66 to disengage itself from its seating surface and permit the flow of fluid from passage 47 into motor port 36.

In accordance with the invention, the aforementioned body portion 66b of valve member 66 is provided with an inwardly tapered configuration, as best illustrated in FIG. 6. A suitable taper or angle X (FIG. 6) has been found to be approximately 10°, and such tapering preferably commences as at 89, inwardly of the seat engaging surface 89a of the valve member, and continues to a point 90 (FIG. 6) outwardly of the inner end of the valve member, whereupon the valve is preferably tapered sharply inwardly, and at an angle Z of preferably approximately 45°, with face 92 of the valve member being generally parallel to face 89a. This arrangement provides a smooth metering of pressurized fluid through the power check valves 56, 56'.

As can be best seen in FIG. 3, in the normal position of the balancing piston member 70, with the nut 76 engaging the confronting surface 77 of the valve body, and with the spring 83 urging the valve member 66 into engagement with the valve seat member 60, there may be a slight clearance between the nut member 76 and the adjacent valve member 66, the latter being, as aforementioned, axially movable on the balancing piston stem 69.

The basic purpose of an open center, four-way valve is to selectively connect ends of a working cylinder with high pressure fluid from a source, generally in the form of a fixed displacement pump and the system reservoir. This type of valve usually connects one end of the cylinder to the pump, while at the same time connects the other end of this cylinder to the reservoir, and vice versa, and as generally illustrated in FIG. 8. Depending on the nature of the load, work may be performed by the pump or by the load. In the latter case, the load must be lowered, the energy being converted to heat in the valve by throttling.

Operation of the valve may be as follows:

When the operator lowers or pushes down the valve spool 38 and as by means of handle 38a, so as to communicate the passage 46 carrying pressurized fluid from the pump with passage 47 in the valve body, it will be seen that the central opening 44a in web 45 tends to be closed by the land 40, thereby tending to cut off the pressurized fluid from the pump, from exit port 34 and direct it to passage 47. Also land 51 further opens chamber 52a to passage 47a. The pressurized fluid enters passageway 47, it being seen that exhaust port 36 has then been closed off by land 50 during downward movement of the spool, and moves through openings 62 in the check valve seat member 60, and into engagement with the valve member 66. Once the generally slight pre-load in spring 83 is overcome by the pressure in passage 47, the valve member 66 is moved away from its seating engagement with seat member 60, thus permitting pressurized fluid to flow into port 36, thereby causing pressurized fluid to flow via transfer line 37 to one end of the double acting motor unit 16, driving the piston of the motor unit toward the right, as viewed in FIG. 8.

It will be seen that the valve member 66 meters the flow of fluid by it, due to the tapered relationship of the body portion 66b of the valve member, disposed in telescoping relation in the seat member 60, and that the greater the outward movement of the valve member away from sealing engagement with surface 64 on the seat 60, the progressively greater the flow of fluid occurs through the valve assembly 56.

Pressurized fluid in passageway 47 also passes through the orifices 62 in the seat insert and through the orifices 78 in the nut member 76, and acts against the force transfer piston 58, thus causing movement of the balancing piston 70' of power check unit 56' downwardly (as viewed in FIG. 3) against the resistance to compression of spring 86', and the nut 76' of unit 56' engages the valve member 66', and moves such valve member 66' away from its seating relationship with its seat member 60', thus permitting the fluid ahead of the piston of the motor unit 16 to flow via port 36a through the checking valve unit 56' to passageway 47a, into chamber 52a as controlled by metering slots 39 in land 51 on spool 38, and then through the exhaust port 39a to the reservoir. It will be seen that with such an arrangement, the balancing piston 70', and the check valve 66', acting as a unit, can be moved just by overcoming the pre-load in the spring member 86'. Since the chamber 72' in which the piston member 70' moves is connected via the passageway 80' and orifice 81' with the passageway 47a, the power check valve 66' is maintained in straight hydraulic balance, and can be moved by the force transfer plunger 58, once the pre-load in the spring 86' is overcome. Thus the power check 56' and its resistance to motion to permit exhaust of fluid from the motor unit 16 is generally independent of the fluid pressure at or in the port 36a, and a rise in pressure in passage 47, acting on the cross sectional area of the force transfer plunger 58, will create a corresponding force transmitted to nut 76' of unit 56', tending to disengage the check valve 66' from its seating surface 64', and accordingly metering the flow of fluid by the valve 66' to passage 47a and thence via metering slots 49 to the exhaust port 39a, to the reservoir.

While lowering a load, the pump P through the center by-pass 46 may be connected to passage 47. Since the load itself generates pressure in port 36a, the port 36 is subjected to relatively low pressure. Once the pressure in the passage 47 becomes sufficiently great to overcome the pre-load of the check valve spring 83, port 36 will become open to passage 47. The rising pressure in passage 47 acting on the cross sectional area of the force transfer plunger 58 will create a force sufficient to overcome the pre-load in the spring 86' moving the balanced check valve and the balancing piston arrangement 56' off the sealing surface 69'. The high pressure fluid from the port 36a will rush through the passage 47a and metering slots 49 on the spool 38, to the tank core 52a. Since the flow of fluid through the metering slots 49 can only be induced by existing pressure drop between passage 47a and the core passage 52a, the pressure in the passage 47a will begin to rise. This rise of pressure acting on the cross sectional area of the force transfer plunger 58 will partly cancel the pressure force developed on the opposite end of the transfer plunger, and resulting in spring 86' tending to reseat the power check 56' and with a corresponding reduction in the flow area past the sealing surface 64', will reduce the flow from port 36a, reducing the pressure drop through the metering slots 49, and therefore reducing the opposing force on the force transfer plunger 58. Accordingly, the check valve and balancing piston 56' acting as a unit, will automatically maintain the pressure in the passage 47a proportional to the pressure in the passage 47, the difference between these two pressures being generally equivalent to the pre-load in the spring 86'.

Since for any set of conditions, this arrangement acting as a close loop control will maintain a constant pressure in the passage 47a, and since the tank cores (e.g. 52a) are always maintained at a relatively constant reservoir pressure, the flow through the metering slots 49 will be constant. Therefore, the velocity of the load being lowered will be constant irrespective of the pressure in the exhaust port (e.g. 36a). If the pressure in the port 36a would rise or fall, the associated check valve will automatically adjust its position, to maintain a constant pressure in the passage 47a, and therefore constant flow through metering slots 49. A change in the area of the metering slots 49 will proportionately change the flow, and therefore the velocity of the load. A change in the pressure in passage 47 will automatically change the pressure in the passage 47a, and with the area flow of metering slots 49 remaining constant, will change the flow in proportion to the square root of the pressure in passage 47.

Since the movement of the spool 38 will change the pressure in the distributing passages (e.g. 47) and depending on the shape of the metering slots 49 may change their area flow, each position of the spool 38 corresponds to a specific change in the velocity of the descending load, irrespective of the magnitude of the load. The check valve units 56, 56' will modulate, to maintain automatically the conditions as dictated by the position of the spool.

It will be noted that once the full flow of the pump is diverted into passage 47 and port 36, any further increase in the descending load velocity would automatically lower the pressure in the passage 47, since the pump would not be capable of supplying this flow. This automatically in the manner described above would readjust the position of the check-balancing piston combination 56', thereby tending to maintain the velocity of the load descent proportional to the maximum flow of the pump. This provides anti-cavitation protection, limiting the maximum speed of movement of the load to the output of the pump. Accordingly, by regulating the output of the pump and with the spool 38 in one of its extreme positions, the maximum speed of the descending load can be correspondingly regulated.

While the valve has been illustrated with a control spool 38 and power checks 56, 56' being disposed integrally in the same valve body, it will be understood that members 38 and 56, 56' could be disposed in separate valve bodies, connected for instance by fluid transmitting lines. It will also be understood that while the device has been illustrated and described in connection with a double acting motor unit, that the invention could also be expeditiously utilized with a single acting motor unit, or with double acting units where a load is applied in one direction only.

Figure 7:
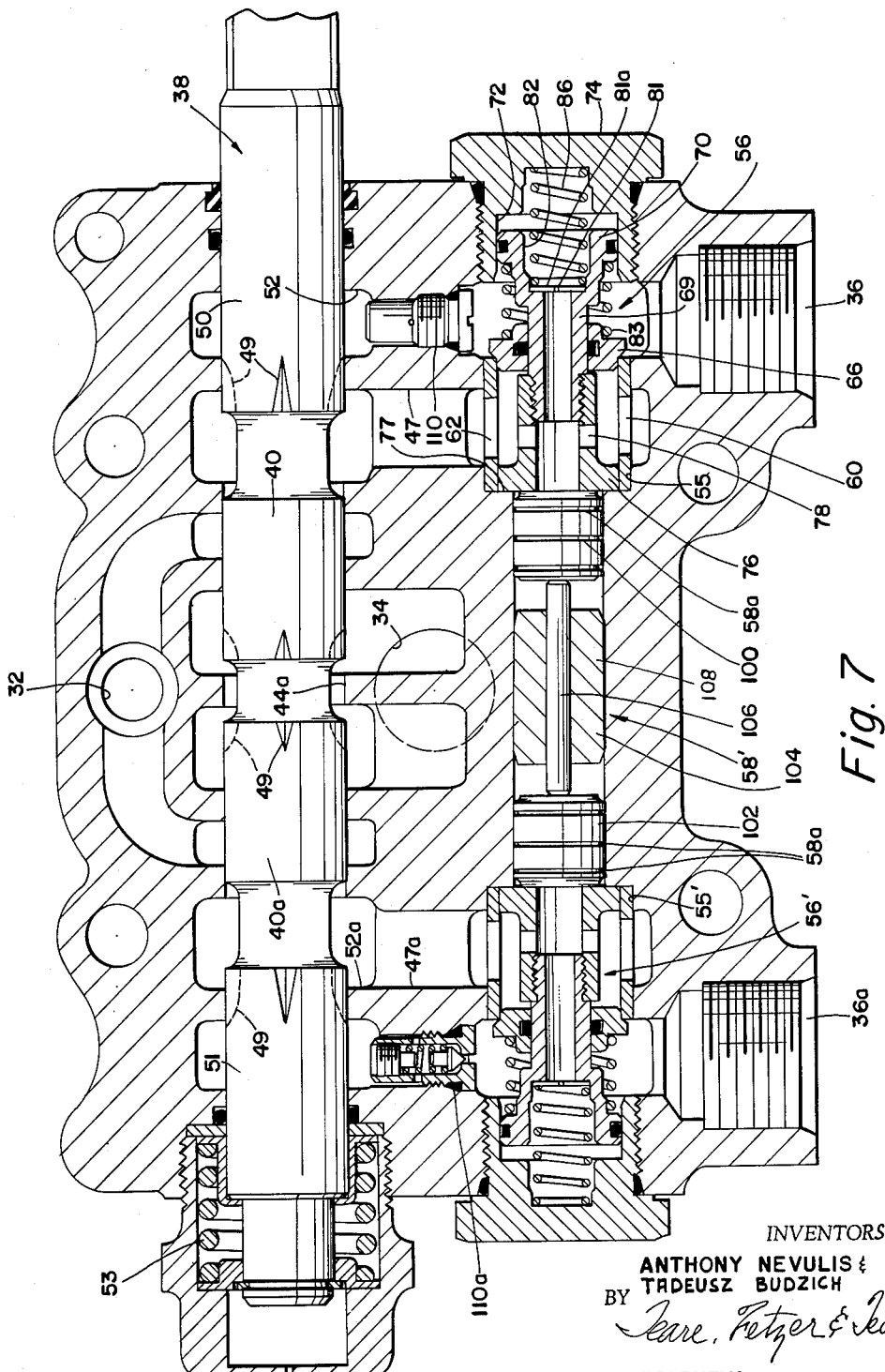
FIG. 7 is a view generally similar to that of FIG. 3, but illustrating a modified form of the control valve.

Referring now to FIG. 7, there is illustrated a modified form of the control valve, and wherein the force transfer plunger 58' comprises two end plunger portions 100, 102 between which is disposed a central portion 104 comprising a stem 106 adapted for engagement with end portions 100, 102 and preferably mounted in a sealing member 108 formed of a fairly good wiping or sealing material, such as fiber, brass etc. Plunger 58' is adapted to operate in a similar manner as plunger 58 of the first described embodiment. Moreover, in this embodiment, there are provided adjustable, poppet-type check valves 110, 110a, which extend respectively between chambers 55 and 52, and 55' and 52a, for providing for the escape of pressurized fluid at respectively ports 36 and 36a, if the pressure at such ports would rise above a predetermined maximum. In other respects, the valve is generally similar to the first described embodiment.

From the foregoing discussion and accompanying drawings, it will be seen that the invention provides a novel control valve for smoothly controlling the movement of a fluid powered motor unit and one that is generally independent of the changes in force due to the loading on the motor unit, and a valve where extremely smooth and effective operation is obtained, by the provision of novel means for metering the flow of fluid through the valve.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

We claim:

1. In a valve for use in a fluid system for controlling the actuation of a fluid powered motor unit adapted to raise and lower a load, said valve comprising a housing having an inlet port, an exhaust port and a pair of motor ports, said housing having a first passage therein for communicating one of said motor ports with said inlet port, and a second passage therein for communicating the other of said motor ports with said exhaust port, a valve member for controlling the application of pressurized fluid from said inlet port to said one motor port and controlling the egress of fluid from said other motor port to said exhaust port, a valve assembly including a valve seat and a coacting poppet-like member in said second passage and disposed between said other motor port and said exhaust port, for controlling the egress of fluid from said other motor port to said valve member, said valve assembly including means making said valve assembly generally independent of fluid pressure at said other motor port, fluid pressure responsive means in said housing coacting with said valve assembly for actuating said valve assembly, said pressure responsive means being adapted for actuation by fluid pressure upon actuation of said valve member to apply pressurized fluid from said inlet port to said one motor port, and tapered means on both said valve assembly and said valve member for metering the flow of fluid from said other motor port to said exhaust port upon actuation of said valve assembly by said pressure responsive means, said tapered means on said valve member being operative to actuate said pressure responsive means to cause movement of said poppet-like member toward said valve seat whereby fluid flow to said exhaust port is automatically maintained at a constant pre-selected level.

2. In a valve for use in a fluid system for controlling the actuation of a fluid powered motor unit adapted to raise and lower a load, said valve comprising a housing having an inlet port, an exhaust port and a pair of motor ports, said housing having a first passage therein for communicating one of said motor ports with said inlet port and a second passage therein for communicating the other of said motor ports with said exhaust port, a slide valve for controlling the application of pressurized fluid from said inlet port to said one motor port and controlling the egress of pressurized fluid from said other motor port to said exhaust port, a valve assembly in said second passage including a valve seat, a piston member operating in a cylinder, and a coacting relatively movable poppet-like member, disposed between said other motor port and said exhaust port, for controlling the egress of fluid from said other motor port to said slide valve, fluid pressure responsive means in said housing coacting with said valve assembly for actuating said valve assembly, said valve assembly comprising resilient means urging said poppet-like member into engagement with said valve seat and away from said piston member and urging said poppet-like member and said piston member as a unit toward said pressure responsive means, said pressure responsive means being adapted for actuation by fluid pressure upon actuation of said slide valve to apply pressurized fluid from said inlet port to said one motor port, said valve assembly including means making said valve assembly generally independent of fluid pressure at said other motor port, the last mentioned means comprising substantially equal effective pressure areas on one end of said piston member and on said poppet-like member adapted for exposure to fluid pressure at said other motor port, and tapered means on both said poppet-like member and said slide valve for metering the flow of fluid from said other motor port to said exhaust port upon actuation of said valve assembly by said pressure responsive means, said tapered means on said valve member being operative to actuate said pressure responsive means to cause movement of said poppet-like member toward said valve seat whereby fluid flow to said exhaust port is automatically maintained at a constant pre-selected level.

3. A valve in accordance with claim 2 wherein said valve seat comprises a cylindrical tubular-like member and said valve poppet-like member comprises a frusto-conical head portion adapted for engagement with one end of said tubular-like member for sealing said second passage against the flow of pressurized fluid therethrough, said tapered means on said poppet-like member comprising a body portion on said poppet-like member projecting outwardly from said head portion into telescoped relation in said tubular-like member, said body portion being tapered in a direction toward the free end of said body portion and axially away from said head portion.

4. A valve in accordance with claim 3 wherein said valve assembly includes a stem extending axially outwardly from said piston member and into said tubular seat member, means on said stem adapted for abutting engagement with said pressure responsive means, said poppet-like member being axially movable on said stem, said resilient means urging said piston and associated stem means toward engagement with said pressure responsive means, and means in said valve assembly communicating the other end of said piston member interiorly of said cylinder with said exhaust port.

5. A valve in accordance with claim 4 wherein said fluid pressure responsive means comprises an axially movable plunger axially aligned with said valve assembly and engageable with said stem means.

6. A valve in accordance with claim 4 wherein said fluid pressure responsive means comprises a pair of spaced axially movable plungers axially aligned with said valve member, and sealing means movable axially and disposed between and in engagement with said spaced plungers.

7. A valve in accordance with claim 3 wherein said body portion of said poppet-like member comprises a frusto-conical configuration extending into said tubular-like member and with said body portion being tapered at about 10° in a direction toward said tubular-like member, commencing in axially spaced relation from the engagement of said head portion with said tubular-like member, whereby the spacing between the tapered surfaces of said body portion and said tubular-like member increases after predetermined movement of said poppet-like member away from said tubular-like member.

8. In a valve for use in a fluid system for controlling the actuation of a fluid powered motor unit adapted to raise and lower a load, said valve comprising, a housing having an inlet port and an exhaust port, and a pair of motor ports, said housing having a first passage therein for communicating one of said motor ports with said inlet port and a second passage therein for communicating the other of said motor ports with said exhaust port, a valve member for controlling the application of pressurized fluid from said inlet port to said one motor port and controlling the egress of fluid from said other motor port to said exhaust port, a valve assembly including a valve seat and a coacting poppet-like member in said second passage disposed between said other motor port and said exhaust port for controlling the egress of fluid from said other motor port to said valve member, said valve assembly including means making said valve assembly generally independent of fluid pressure at said other motor port, fluid pressure responsive means in said housing coacting with said valve assembly for actuating said valve assembly, said pressure responsive means being adapted for actuation by fluid pressure upon actuation of said valve member to apply pressurized fluid from said inlet port to said one motor port, and metering means coacting with each of said valve assembly and said valve member for metering the flow of fluid from said other motor port to said exhaust port upon actuation of said valve assembly by said pressure responsive means, said metering means which coacts with said valve member being operative to actuate said pressure responsive means to cause movement of said poppet-like member toward said valve seat whereby fluid flow to said exhaust port is automatically maintained at a constant pre-selected level.

References Cited by the Examiner
UNITED STATES PATENTS

| | | | |
|---|---|---|---|
| 1,729,802 | 10/29 | Smith | 251—122 XR |
| 1,911,905 | 5/33 | Knowlton et al. | 251—122 XR |
| 2,001,487 | 5/35 | Doherty | 251—121 |
| 2,483,312 | 9/59 | Clay | 91—420 XR |
| 2,926,634 | 3/60 | Falendysz et al. | 91—420 XR |
| 3,072,149 | 1/63 | Hasbany | 137—625.69 |

M. CARY NELSON, *Primary Examiner.*

MARTIN P. SCHWADRON, *Examiner.*